United States Patent [19]

Matsushima

[11] Patent Number: 5,327,525
[45] Date of Patent: Jul. 5, 1994

[54] SYSTEM FOR READYING HOST DEVICE TO TRANSFER DATA TO RECORDING DEVICE IN RESPONSE TO GATING SIGNAL SENT FROM RECORDING DEVICE

[75] Inventor: Kenichi Matsushima, Tokyo, Japan

[73] Assignee: Seiko Instruments Inc., Japan

[21] Appl. No.: 963,008

[22] Filed: Oct. 19, 1992

Related U.S. Application Data

[63] Continuation of Ser. No. 397,039, Aug. 22, 1989, abandoned.

[30] Foreign Application Priority Data

Aug. 23, 1988 [JP] Japan .................................. 63-208795

[51] Int. Cl.⁵ ........................ G06K 15/00; H04N 1/32
[52] U.S. Cl. ................................ 395/114; 358/296; 358/436; 358/435
[58] Field of Search ............... 395/113, 114, 107, 153; 358/296, 298, 435, 436, 437; 346/154, 160

[56] References Cited

U.S. PATENT DOCUMENTS

| | | | |
|---|---|---|---|
| 4,647,982 | 3/1987 | Aoi | 358/296 |
| 4,805,135 | 2/1989 | Ochi et al. | 364/900 |
| 4,843,571 | 6/1989 | Notermans et al. | 364/519 |
| 4,930,087 | 5/1990 | Egawa et al. | 364/518 |
| 4,941,108 | 7/1990 | Aoyagi et al. | 364/519 |
| 5,014,221 | 5/1991 | Mogul | 364/519 |

Primary Examiner—Raymond L. Bayerl
Attorney, Agent, or Firm—Bruce L. Adams; Van C. Wilks

[57] ABSTRACT

A system for transferring and recording image data. A host device outputs a video signal representative of image data and a request signal effective to request recording of the image data. A recording device is responsive to the request signal to return to the host device a gating signal defining a preceding preparation interval and a succeeding transfer interval and effective to enable the host device to complete preparation of transfer of the image data within the preceding preparation interval and to carry out the transfer of the image data during the succeeding transfer interval from the host device to the recording device so that the recording device records the image data.

23 Claims, 3 Drawing Sheets

SYSTEM FOR READYING HOST DEVICE TO TRANSFER DATA TO RECORDING DEVICE IN RESPONSE TO GATING SIGNAL SENT FROM RECORDING DEVICE

This is a continuation of parent application Ser. No. 397,039 filed Aug. 22, 1989, now abandoned.

BACKGROUND OF THE INVENTION

The present invention relates to image recording devices receptive of a video signal from a host device, such as computer, for recording or printing an image which may be normally displayed by a CRT display device controlled through the host device.

FIG. 7 illustrates the recording operation of the conventional recording device, in which image data is transferred to the recording device in the form of a video signal. At first, a desired image is held in the host device, and a video signal line is connected to the recording device. Then, a request or command signal is inputted into the recording device from the host device so as to enable the recording device. Thereafter, the recording device starts to receive image data representative of the held image in the form of a video signal through the connected signal line. The recording device counts a predetermined period of time in response to the command signal such that the image data is transferred within the period and the image is also held during the period. Alternately, the operator watches a printing unit of the recording device and holds the connection of the signal line until the operator recognizes the completion of image recording.

However, in the prior art, a transfer interval of the image data in the form of the video signal is not uniformly determined, but is varied according to the scanning timing of the video signal and gradation levels of the image to be recorded. Thus the predetermined period is determined sufficiently long to cover the variable transfer interval, thereby causing the problem that redundant time is consumed during the image data transfer.

Further, it may happen that the recording device may have trouble incidentally so that the recording device can not receive or admit the transmitted video signal. In such case, there is caused the problem that the host device inadvertently transfers the image data which can not be recorded safely by the recording device.

Furthermore, in the case that the operator controls the image data transfer while watching the printing unit of the recording device, there is the caused problem that the operation is time consuming and inconvenient when the host device and the recording device are located away from each other.

SUMMARY OF THE INVENTION

An object of the present invention is to, therefore, reduce a holding period of the image within which the image data is transferred. Another object of the present invention is to prevent inadvertent operation of the image recording.

According to the present invention, the recording device operates to return to the host device a data gating signal in response to the command signal prior to the start of the video signal transfer. In response to a leading edge of the data gating signal, the host device and its peripheral device or the operator starts preparation operation for transfer of the image data in the form of a video signal. In order to provide a sufficient preparation interval for the host device, etc., the image recording device has a timer for counting a given time interval from the leading edge of the data gating signal and starts admission of the image data after the lapse of the counted preparation interval. On the other hand, the host device and its peripheral devices such as a video signal switching circuit and a video signal selecting device complete the preparation of data transfer during the assigned preparation interval.

The recording device produces the data gating signal having a duration defined between its leading and trailing edges and comprised of the preparation interval and a subsequent data admission interval. The data admission interval is terminated by the trailing edge of the gating signal in response to completion of the data admission. The image data may be transferred intermittently during the data admission interval due to the scanning timing of the video signal and the operation of an interface provided in a printing or hard copy unit of the recording device.

DETAILED DESCRIPTION OF PREFERRED EMBODIMENTS

Figure 1:
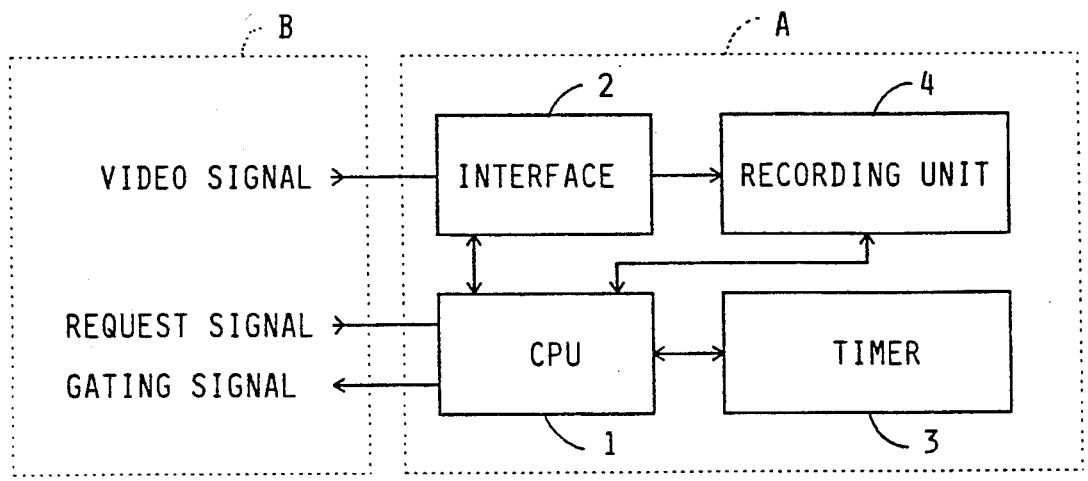
FIG. 1 is a schematic block diagram of a recording device according to the present invention.

Referring to FIG. 1, the inventive image recording device A is comprised of a CPU or control circuit 1 receptive of a request or command signal from a host device B, an interface 2 receptive of a video signal from the host device B, a timer 3 connected to the CPU 1 for counting a given time interval and a recording or printing unit 4 for effecting the recording or printing of an image according to the video signal.

Figure 6:
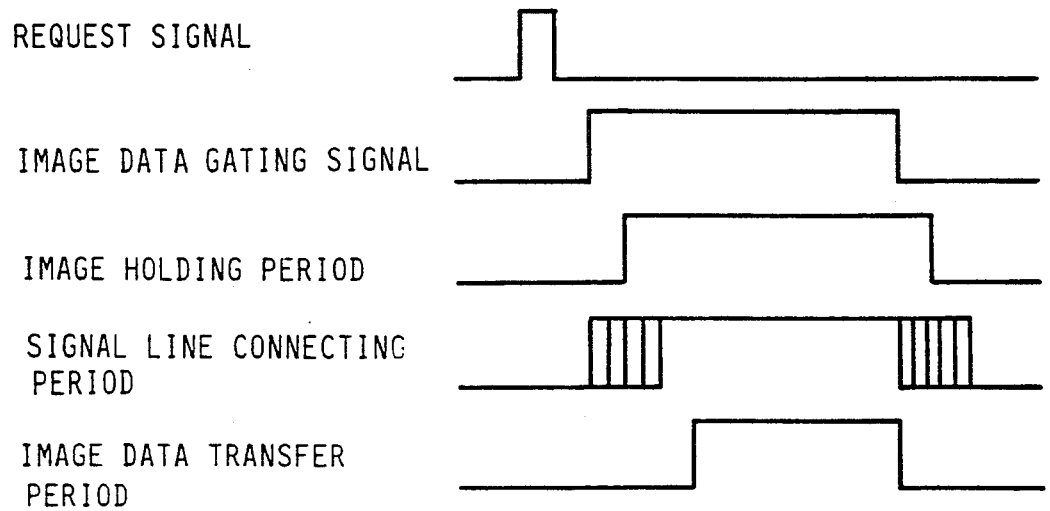
FIG. 6 is a timing chart illustrating the operation of the inventive recording device.
Figure 7:
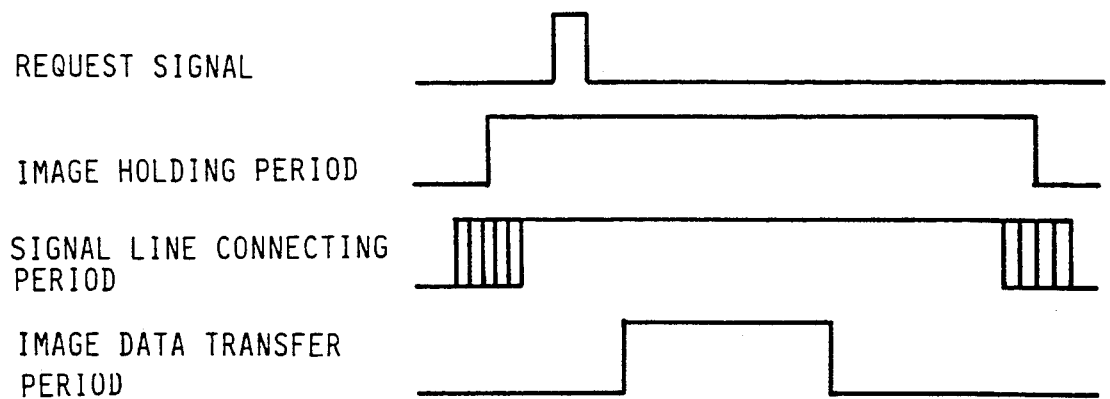
FIG. 7 is a timing chart illustrating the operation of the conventional recording device.

In operation, referring to FIG. 6, when the CPU 1 receives the request signal effective to command the recording device A to record an image, the CPU 1 checks that the recording device A is operative and has no trouble and returns to the host device B an image data gating signal having a given duration between its leading and trailing edges. The host device B operates in response to the leading edge to carry out preparation of image data transfer such as to connect a video signal line to the interface 2 of the recording device A and to hold an image to be recorded. Meanwhile, the timer 3 starts in synchronization with the leading edge of the gating signal to count a predetermined preparation time interval long enough to enable the host device B to complete the preparation of image data transfer. Then, the interface 2 operates to admit the image data in the form of a video signal from the host device B, and the printing unit reproduces a hard copy of the image according to the admitted video signal. After the completion of the image data transfer, the CPU 1 terminates the image data gating signal so that signal line is disconnected and the holding of the image is released.

On the other hand, if the CPU 1 recognizes any trouble in the recording device A, the CPU 1 does not output the image data gating signal regardless of inputting of the request signal so that the host device B can recognize that a desired image can not be recorded.

A logic circuit and other control circuit can be used instead of the CPU to effect outputting of the data gating signal and to control the timer.

Further, the recording device A may be provided with an independent printing unit operative to record an image data according to the video signal.

Figure 2:
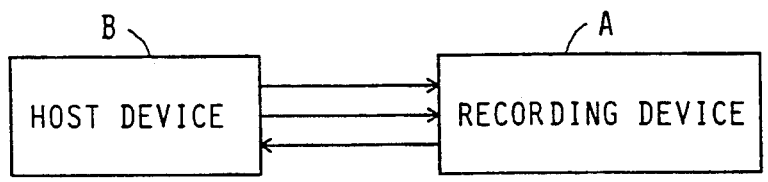
FIG. 2 is a schematic block diagram of an image data transferring and recording system comprised of a host device and the recording device.

FIG. 2 shows a diagramatic view of the image data transferring and recording system comprised of a host device B and a recording device A. The host device B and the recording device A are connected to each other through a video signal line, a request signal line and an image data gating signal line.

Figure 3:
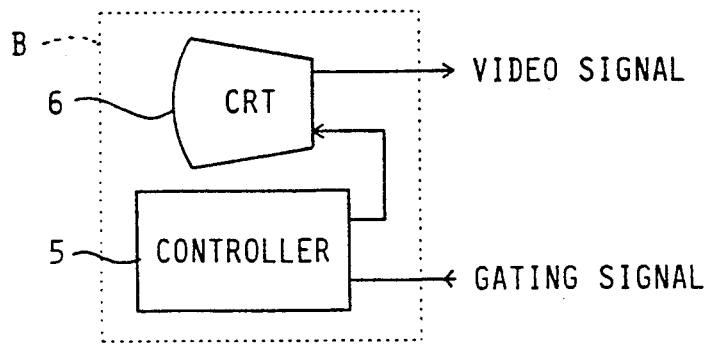
FIG. 3 is a schematic diagram of the host device.

FIG. 3 shows a schematic block diagram of the host device B. The host device B is comprised of a controller 5 for processing or controlling a video signal and a CRT 6 for displaying moving or stationary images. When transferring a desired image data, the controller 5 must hold the image during the data transfer in order to avoid disturbance of the display state.

Figure 4:
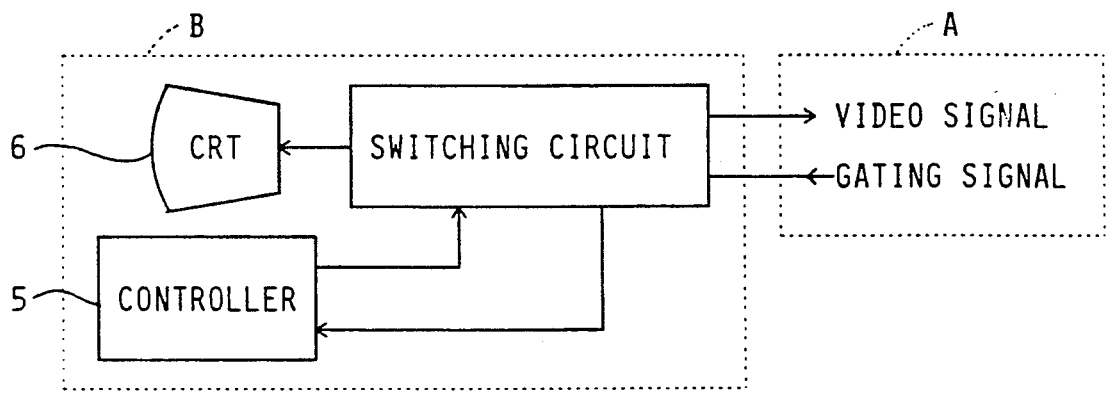
FIG. 4 is a schematic block diagram showing one embodiment of the system comprised of a host device and a recording device connected thereto through a signal switching circuit.

FIG. 4 shows one embodiment of the image data transferring and recording system comprised of a host device B and a recording device A. The host device B includes a video signal switching circuit 7 responsive to the inputting of the data gating signal to switch the video signal of the controller 5 from the CRT 6 to an outgoing video signal line connectable to the recording device A.

Figure 5:
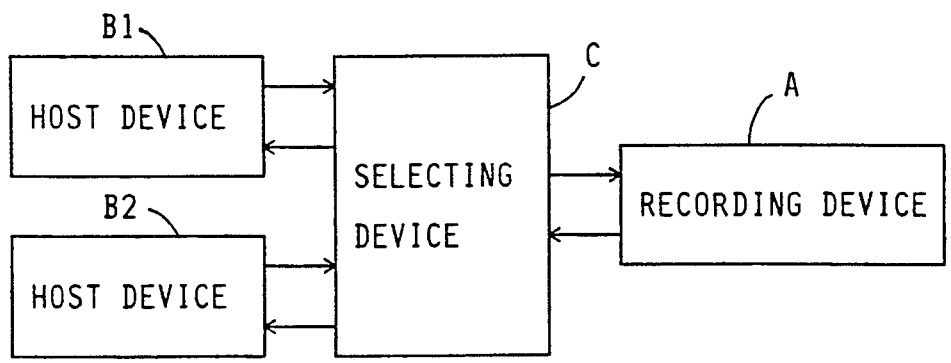
FIG. 5 is a schematic block diagram showing another embodiment of the system comprised of a host device, a recording device and a signal selecting device connected therebetween.

FIG. 5 shows another embodiment of the image data transferring and recording system comprised of a plurality of parallel host devices B1 and B2, a recording device A and a video signal selecting device C connected between the host devices B1 and B2 and the recording device A for selecting one of the host devices B1 and B2 which outputs a video signal representative of a desired image to be transferred and recorded. In either of the FIGS. 4 and 5 embodiments, the signal switching circuit 7 and the signal selecting device C need a preparation interval for switching or selecting of the video signal and for connecting to the recording device A prior to the transfer of the image data. Thus, the recording device A operates in response to the command or request signal to return an image data gating signal having a preceding duration assigned to the preparation and a succeeding duration assigned to the transfer of image data.

As described above, according to the present invention, various advantages can be obtained as follows. The image data can be safely transferred from the host device to the recording device, because the transfer is inhibited when the recording device has troubles. The host device or operator can recognize a period needed to hold the image. The holding period can be minimized where the signal switching circuit or signal selecting device is used to switch or select the video signal. As a result, the operability of the host device can be greatly improved for transferring and recording a desired image.

What is claimed is:

1. A system for transferring and recording image data, comprising:
a host device for repeatedly outputting at a certain rate a video signal representative of image data to a cathode-ray tube for display of the image data by the cathode-ray tube and for outputting a request signal effective to request recording of the image data represented by the video signal being repeatedly outputted; and
a recording device responsive to the request signal to return to the host device a gating signal effective to change over coupling between the video signal and the cathode-ray tube to coupling between the video signal and the recording device or to change over coupling between the video signal and the recording device to coupling between the video signal and the cathode-ray tube, the gating signal defining a preceding preparation interval and a succeeding transfer interval, the recording device having means to enable the host device to complete preparation of transfer of the image data and to change over the coupling within the preceding preparation interval and to enable the host device to carry out the transfer of the video signal during the succeeding transfer interval from the host device to the recording device so that the recording device records the image data.

2. A system according to claim 1; wherein the recording device comprises an interface for admitting the vide signal, a control circuit responsive to the request signal to output the gating signal for controlling the interface to admit the video signal during the transfer interval and for terminating the gating signal when the transfer of the image data is completed, and a printing unit for recording the image data in the form of a hard copy.

3. A system according to claim 2; wherein the recording device includes a timer for counting a predetermined preparation interval.

4. A system according to claim 1; wherein the host device includes a switching circuit for switching the video signal within the preparation interval.

5. A system according to claim 1; including a plurality of host devices for producing respective video signals, and a selecting device connected between the host devices and the recording device for selecting one of the video signals within the preparation interval.

6. A system for transferring and recording image data, comprising: a host device having means for repeatedly producing at a prescribed repetition rate a video signal representative of image data and for applying the video signal to a cathode-ray tube for display of the image data by the cathode-ray tube, means for producing a request signal to request recording of the image data represented by the video signal being repeatedly produced, and means responsive to a gating signal for completing preparation for transfer of the image data, the preparation including holding preselected image data to be recorded; and a recording device connectable to the host device and having means responsive to the request signal for producing a gating signal and applying the gating signal to the host device, the gating signal having a given duration defining a predetermined preparation interval followed by a transfer interval, the preparation interval being sufficient to enable the host device to complete preparation of the transfer of the image data and the transfer interval being sufficient to enable the host device to carry out the transfer of the image data to the recording device, and recording means responsive to the video signal for recording the transferred preselected image data in the form of a hard copy.

7. A system according to claim 6; wherein the means for producing a video signal representative of image data comprises means for continuously producing the video signal whether or not the image data is being transferred to the recording device.

8. A system according to claim 7; further including means responsive to the gating signal for switching the video signal from the cathode-ray tube to the recording device.

9. A system according to claim 8; wherein the recording device includes timing means for establishing the predetermined preparation interval of the given duration of the gating signal.

10. A system according to claim 9; wherein the timing means includes a timer for counting a predetermined preparation interval, the counting of the timer beginning in synchronization with a leading edge of the gating signal.

11. A system according to claim 6; wherein the recording device includes an interface for admitting the video signal and applying the video signal to the recording means, and wherein the means responsive to the request signal comprises control means for producing the gating signal and controlling the interface to admit the video signal during the transfer interval thereof and for terminating the gating signal when the transfer of the preselected image data has been completed.

12. A system according to claim 11; wherein the control means comprises a central processing unit.

13. A system according to claim 6; wherein the host device includes switching means for switching the video signal to the recording device within the preparation interval of the gating signal.

14. A system according to claim 6; including a plurality of host devices each having means for producing respective video signals representative of image data; and selecting means connected between the host devices and the recording device for selecting one of the video signals to be applied to the recording device within the preparation interval of the gating signal.

15. A system according to claim 6; further including means responsive to the gating signal for switching the video signal from the cathode-ray tube to the recording device.

16. A system according to claim 15; wherein the recording device includes timing means for establishing the predetermined preparation interval of the given duration of the gating signal.

17. A system according to claim 16; wherein the timing means includes a timer for counting a predetermined preparation interval, the counting of the timer beginning in synchronization with a leading edge of the gating signal.

18. A system according to claim 15; wherein the means responsive to the gating signal includes means for switching the video signal to the recording device within the preparation interval of the gating signal.

19. A system for transferring and recording image data, comprising: a host device comprising a cathode-ray tube, means for repeatedly outputting at a repeat rate of 50 to 60 times per second a video signal representative of image data to the cathode-ray tube for display, and means for outputting a request signal for requesting recording of the video signal being repeatedly outputted to the cathode-ray tube; and a recording device for providing a gating signal to the host device in response to the request signal, the gating signal being returned prior to the start of transfer of the video signal from the host device to the recording device and including a preparation interval during which the host device completes preparation of the video signal for transfer to the recording device and a data transmission interval during which the video signal is transferred to the recording device so that the video signal is alternately received by the cathode-ray tube and the recording device in response to the gating signal.

20. A system for transferring and recording image data according to claim 19; wherein the gating signal has a leading edge, and the recording device further includes timing means for beginning timing of the preparation interval in synchronism with the leading edge, the preparation interval having a duration long enough to complete preparation of the video signal by the host device for transfer to the recording device.

21. A system for transferring and recording image data according to claim 19; wherein the host device includes controlling means for holding the video signal while the video signal is transferred to the recording device and controlling the cathode-ray tube to display the image data represented by the held video signal.

22. A system for transferring and recording image data according to claim 21; wherein the host device includes switching means responsive to the gating signal for switching input of the video signal between the controlling means and the recording device.

23. A system for transferring and recording image data according to claim 19; further comprising a parallel host device comprising means for repeatedly outputting a same video signal representative of image data, and means for outputting a request signal for requesting recording of the video signal being repeatedly outputted; and selecting means for selecting between the video signal outputted by the host device and the video signal outputted by the parallel host device for transfer to and recording by the recording device.

* * * * *